June 9, 1964  D. F. GREGG, JR  3,136,461
AUTOMOBILE SERVICE BAR
Filed Aug. 1, 1962
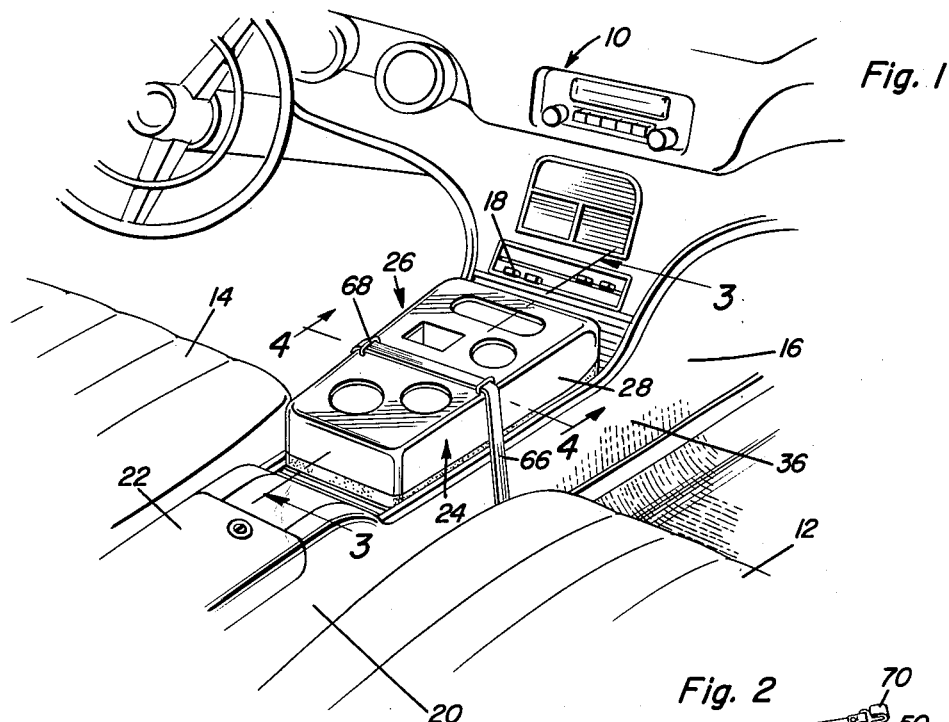
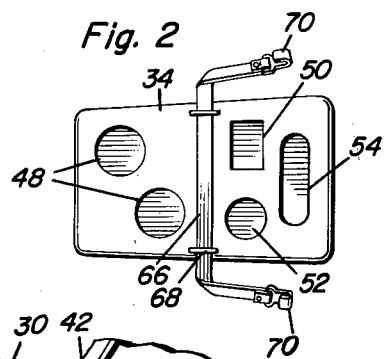
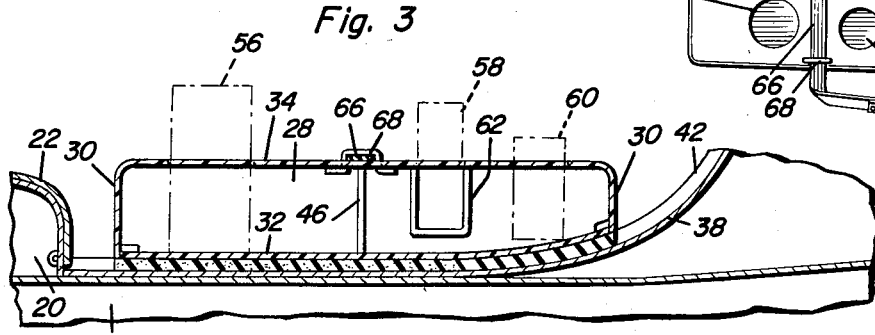
David F. Gregg, Jr.
INVENTOR.

ent Office 3,136,461
Patented June 9, 1964

3,136,461
AUTOMOBILE SERVICE BAR
David F. Gregg, Jr., P.O. Box 196, Fair Bluff, N.C.
Filed Aug. 1, 1962, Ser. No. 214,090
1 Claim. (Cl. 224—42.42)

This invention relates to a novel and useful automobile service bar and more specifically to a housing-like construction adapted to be secured in overlying relation to the drive shaft hump of motor vehicles of the type including separated right and left hand front seats with the drive shaft hump extending between the front seats of the vehicle. The automobile service bar of the instant invention includes an upwardly opening housing having upstanding opposite end and side walls interconnected adjacent their lower edges by means of a bottom wall. The housing includes a top wall having a plurality of openings formed therein which are adapted to receive a plurality of various shaped upright articles and to snugly embrace the sides of the articles when the latter are resting upon the bottom wall of the housing. The bottom wall of the housing curves upwardly toward the top wall thereof at its forward end and accordingly, the spatial relationship between the bottom and top walls of the housing is less at the front end of the housing than it is at the rear end thereof. In this manner, the housing is adapted to support a plurality of articles of different height with at least portions of the articles projecting upwardly through the openings when their lower ends are resting on the bottom wall of the housing.

The service bar has as its main object to provide a means whereby a plurality of various shaped articles may be conveniently supported adjacent the driver of a vehicle and on top of the console formed by the "drive shaft hump" of a vehicle extending between the separated right and left hand front seats of the vehicle.

A further object of this invention, in accordance with the immediately preceding object, is to provide a service bar constructed in a manner whereby it may be readily removably secured to the console of a motor vehicle extending between the separated right and left hand front seats thereof in a manner which will prevent the service bar from being accidentally dislodged from its position atop the drive shaft hump or console.

Still another object of this invention is to provide a service bar in accordance with the preceding objects which will readily adapt itself to being constructed in a manner so that its bottom wall will readily conform to the shape and contour of the upper wall portion of the console on which it is to be secured.

Another object of this invention is to provide a service bar that will efficiently provide a means by which numerous articles may be supported adjacent the driver of a vehicle having a console extending between the separated right and left hand front seats of the vehicle and which will not detract from the appearance of the interior of the vehicle.

A final object to be specifically enumerated herein is to provide an automobile service bar in accordance with the preceding objects which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the interior of a conventional type of sport model automobile which has the "drive shaft hump" constructed in such a manner so as to provide an attractive console extending between the separated right and left hand front seats of the vehicle for housing numerous controls for various systems of the vehicle and a glove compartment or the like and showing the service bar of the instant invention secured atop the console intermediate its opposite end;

FIGURE 2 is a top plan view of the service bar of the instant invention;

FIGURE 3 is an enlarged fragmentary longitudinal vertical sectional view taken substantially upon the plane indicated by the section line 3—3 of FIGURE 1; and FIGURE 4 is an enlarged fragmentary transverse vertical sectional view taken substantially upon the plane indicated by the section line 4—4 of FIGURE 1.

Referring now more specifically to the drawings, the numeral 10 generally designates a conventional type of sports vehicle which is shown in FIGURE 1 of the drawing as including a front seat area having separated right and left hand front seats 12 and 14 between which a "drive shaft hump" 16 extends. The "drive shaft hump" 16 is constructed in a manner to form a console having a pleasing appearance and which is utilized to house numerous controls of the vehicle such as the heater controls 18 and a glove compartment 20 which has a hinged cover 22.

The service bar of the instant invention is generally referred to by the reference numeral 24 and comprises an elongated upwardly opening housing generally referred to by the reference numeral 26. The housing 26 includes upstanding opposite side and end walls 28 and 30 respectively which are interconnected at their lower edges by means of a bottom wall 32.

The housing 26 also includes a top wall 34 which may be formed integrally with the opposite side and end walls 28 and 30.

The console 16 includes opposite sides 36 which are interconnected at their upper ends by means of a top wall portion 38 and it may be seen from FIGURE 4 of the drawings that the console 16 has as its main purpose to provide clearance for the drive shaft 40 of the vehicle 10.

With attention now directed again to FIGURE 4 of the drawings it will be noted that the console 16 includes opposite side and upwardly projecting longitudinal ridges 42 and it will be noted that a base pad 44 which may be constructed of resilient material is secured to the under surface of the bottom wall 32 in any convenient manner and is snugly received between the ridges 42.

The housing 26 includes at least one pair of opposite side reinforcing webs 46 for a purpose which will be hereinafter more fully set forth and the top wall 34 of the housing 26 includes a plurality of openings 48, 50, 52 and 54. It will be noted that the openings 48, 50, 52 and 54 are of different shapes and therefore that a plurality of articles 56, 58 and 60 which are of different shapes may be supported from the housing 26 and have their sides snugly embraced by the portions of the top wall 34 defining the openings 48, 50, 52 and 54.

From FIGURE 3 of the drawings it will be noted that an upwardly opening receptacle 62 is secured to the under surface of the top wall 34 and that the upper end of the receptacle 62 is registered with the opening 50. The receptacle 62 may be utilized to support a pack of cigarettes or the like designated by the article 58 in an elevated position above the bottom wall 32 in order that a sufficient amount of the article 58 may project above the top wall 34.

The webs 46 are transversely alined and an elongated strap member 66 is disposed transversely over the top wall 34 and is held in position thereover by means of fasteners 68 carried at the opposite sides of the top wall 34. The free ends of the strap 66 hang downwardly over the sides 36 of the console 16 and are provided with clips 70 which are releasably engageable with anchors 72 secured to the side walls 36 by means of suitable fasteners 74.

It will be noted that the strap 66 may be constructed of resilient material so that it may be elongated in order to disengage one or both of the clips 70 from the anchors 72 during the removal of the service bar 24 from engagement with the console 16. Additionally, the strap 66 is disposed in the same transverse plane containing the webs 46 and it will thus be observed that the webs 46 provide bracing for the housing 26 at the points thereof which are engaged by the strap 66. Accordingly, the housing 26 may be constructed of lightweight materials and still withstand the tension of the strap 66 holding the housing 26 securely on the upper wall portion 38 of the console 16.

It will be noted that the side walls 28 of the housing 26 are not absolutely parallel but they are forwardly divergent so as to be snugly received between the ridges 42 which are also forwardly divergent. In this manner, the wedging engagement of the housing 26 between the ridges 42 prevents movement of the housing 26 rearwardly of the console 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In combination with a motor vehicle of the type including a front seat console defined by the "drive shaft hump" of said vehicle extending between the separated right and left hand front seats of said vehicle and longitudinally of the vehicle from a point spaced rearwardly of said front seats forwardly of the firewall of the vehicle, a service bar comprising an elongated upwardly opening housing including upstanding opposite end and side walls interconnected adjacent their lower edges by means of a bottom wall, said console including an upper wall portion, said bottom wall overlying and generally conforming to the plan shape and cross-sectional contour of said upper wall portion, and means releasably securing said service bar to said "drive shaft hump" in a manner in which said service bar may be readily removed from engagement with said console, said upper wall portion including upwardly projecting longitudinally extending opposite side ridges, a base pad secured to the undersurface of said bottom wall and snugly received between said ridges, said housing including an upper wall having a plurality of openings formed therein adapted to receive a plurality of various shaped upright articles and to snugly embrace the sides of said articles when the latter are resting upon said bottom wall, said bottom wall being closer to the undersurface of said top wall at the forward end of said housing adapting said housing to support a plurality of articles of different types with substantially the same vertical extent of articles projecting upwardly through said openings when their lower ends are resting on said bottom wall, said means releasably securing said housing to said console comprising a plurality of anchors secured to the opposite sides of said console, strap means carried by said housing and having free end portions depending loosely below the opposite sides of said housing, said free end portions including clip means releasably engageable with said anchors, said strap means comprising a strap extending across the top of said housing and including opposite ends comprising said free end portions, said housing including means engaged with said strap and preventing lateral shifting of said strap longitudinally of said housing.

References Cited in the file of this patent

UNITED STATES PATENTS

| | | |
|---|---|---|
| 2,014,745 | Regil | Sept. 17, 1935 |
| 2,235,709 | Hearn | Mar. 18, 1941 |
| 2,372,967 | Martin | Apr. 3, 1945 |
| 2,633,180 | Reed | Mar. 31, 1953 |
| 2,887,216 | Hargraves | May 16, 1959 |
| 3,002,665 | Allen | Oct. 3, 1961 |